ically flat and the other surface having periodic wrinkle-like undulations. A method of making the filter media is also provided. The filter media is useful in electret filters when charged.

United States Patent [19]
Berrigan et al.

[11] Patent Number: 5,658,641
[45] Date of Patent: Aug. 19, 1997

[54] FILTER MEDIA HAING AN UNDULATED SURFACE

[75] Inventors: Michael R. Berrigan, Oakdale; David A. Olson, St. Paul, both of Minn.

[73] Assignee: Minnesota Mining and Manufacturing Company, St. Paul, Minn.

[21] Appl. No.: 522,524

[22] Filed: Sep. 1, 1995

Related U.S. Application Data

[63] Continuation of Ser. No. 291,627, Aug. 17, 1994, abandoned, which is a continuation-in-part of Ser. No. 107,918, Aug. 17, 1993, abandoned.

[51] Int. Cl.$^6$ ............................................. D04M 1/04
[52] U.S. Cl. ............................ 428/152; 428/92; 428/171; 428/167; 428/220; 428/156; 428/903
[58] Field of Search ............................... 428/152, 163, 428/167, 168, 170, 171, 172, 92, 296, 220, 156, 903

[56] References Cited

U.S. PATENT DOCUMENTS 4,375,446  3/1983  Fujii et al. .................. 264/518
4,555,811 12/1985  Shimalla ...................... 2/51
4,807,619  2/1989  Dyrud et al. .

FOREIGN PATENT DOCUMENTS 0 137 094   4/1985  European Pat. Off. .
0 156 160  10/1985  European Pat. Off. .
2 115 459  10/1972  Germany .
92 11405   7/1992  WIPO .

OTHER PUBLICATIONS

Filters and Filtration Handbook, published 1981 by Gulf Publishing Company, Houston, TX.

*Primary Examiner*—Kathleen Choi
*Attorney, Agent, or Firm*—Gary L. Griswold; Walter N. Kirn; Robert H. Jordan

[57] ABSTRACT

Filter media is provided. The filter media comprises a web of melt blown microfibers having one surface substantially flat and the other surface having periodic wrinkle-like undulations. A method of making the filter media is also provided. The filter media is useful in electret filters when charged.

13 Claims, 4 Drawing Sheets

FILTER MEDIA HAING AN UNDULATED SURFACE

This is a continuation of application Ser. No. 08/291,627 filed Aug. 17, 1994, now abandoned which is a continuation-in-part of application Ser. No. 08/107,918, filed Aug. 17, 1993, now abandoned.

FIELD OF THE INVENTION

This invention relates to nonwoven micro fibrous melt blown filter media for removing particulate matter from air and the method of matting the filter media. The filter media may be charged to provide filtration enhancing electret properties. The invention is particularly related to respirators and improving the ability of filter media to sustain low resistance to air flow and good filter efficiency, particularly in the presence of caking aerosols, and improving the electret enhanced filter performance of nonwoven filter media.

DESCRIPTION OF THE RELATED ART

For many years nonwoven fibrous filter webs have been made from polypropylene using melt-blowing apparatus of the type described in Report No. 4364 of the Naval Research Laboratories, published May 25, 1954, entitled "Manufacture of Super Fine Organic Fibers" by Van A. Wente et al. Such melt-blown micro fiber webs continue to be in widespread use for filtering particulate contaminants, e.g., as face masks and as water filters, and for other purposes, e.g., to remove oil from water.

The filtering efficiency of a melt-blown microfiber web can be improved by a factor of two or more when the melt-blown fibers are bombarded as they issue from the die orifices with electrically charged particles such as electrons or ions, thus making the fibrous web an electret. Similarly, the web can be made an electret by exposure to a corona after it is collected. Melt-blown polypropylene microfibers are especially useful, while other polymers may also be used such as polycarbonates and polyhalocarbons that may be melt-blown and have appropriate volume-resistivities under expected environmental conditions.

Common polymers such as polyesters, polycarbonates, etc. can be treated to produce highly charged electrets. The electret structures may be films or sheets which find applications as the electrostatic element in electro-acoustic devices such as microphones, headphones and speakers and in dust particle control, high voltage electrostatic generators, electrostatic recorders and other applications. A film of a dielectric material can also be charged and then split into fibrils which can form an electret filter web.

In the case of many aerosols, e.g., dust or fumes, unacceptable pressure drop increases can occur across the micro fibrous filter media as the aerosols load on the filter media. Furthermore, the amount of electrostatic charge gradually decreases, based on the neutralization of charge on the fiber due to impingement of aerosol components and envirionmental conditions such as heat and humidity, thereby affecting the filtration efficiency of the media.

SUMMARY OF THE INVENTION

The present invention, in one aspect, relates to filter media comprising a web of melt blown micro fibers having one surface substantially flat and the other surface having periodic wrinkle-like undulations, said undulations lying transverse to the web formation direction.

The present invention also relates to electret filter media comprising a web of melt blown microfibers having one surface substantially flat and the other surface having periodic undulations.

The present invention further relates to a resilient cup-shaped filtration face mask adapted to cover the mouth and nose of the wearer of the mask comprising a web of melt blown micro fibers having one surface substantially flat and the other surface having periodic undulations. The web may be charged to provide filtration enhancing electret properties.

The present invention, in a further aspect, provides a method of forming a web of melt blown micro fibers having one face substantially flat and the other face having periodic undulations comprising extruding melt blown microfibers from an extrusion die, collecting said fibers on collector surfaces having a gap therebetween, the contacting portion of the collector surface being parallel to and moving away from said extrusion die and drawing the collected web through said gap, the surface speed of one collecting surface being at least twice that of the other collecting surface. The collector surface having the greater surface speed produces the surface having the undulations. The web may optionally be electrostatically charged.

The electret filter of the present invention is especially useful as an air filter element of a respirator such as a face mask or for such purposes as heating, ventilation, and air conditioning. In respirator uses, the electret filters may be in the form of molded or folded half-face masks, replaceable cartridges or canisters, or prefilters.

When used as an air filter, the uncharged and charged filter media have surprisingly better filtration performance than does a comparable filter not having the undulated surface, particularly when filtering cake forming aerosols such as paint spray.

DETAILED DESCRIPTION OF THE INVENTION

Figure 1:
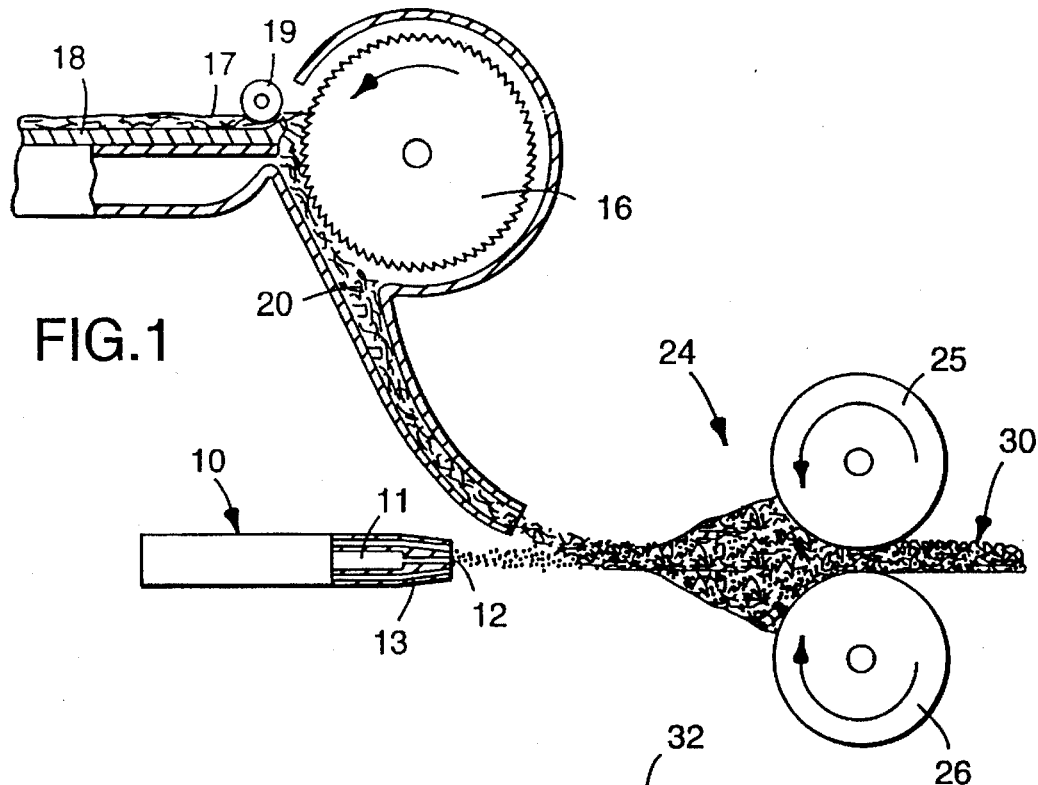
FIG. 1 is a side view of an apparatus useful in making the filter media of the present invention.

The melt blown microfibers useful in the present invention can be prepared as described in Van A. Wente, "Superfine Thermoplastic Fibers," Industrial Engineering Chemistry, vol. 48, pp. 1342–1346 and in Report No. 4364 of the Naval Research Laboratories, published May 25, 1954, entitled "Manufacture of Super Fine Organic Fibers" by Van A. Wente et at.

The melt blown microfibers may be formed of any thermoplastic fiber-forming resin. Examples of such resins are polyolefins such as polypropylene, polyethylene, polybutylene and poly(4-methyl-1-pentene), polycarbonates, polyesters, polyamides, polyurethanes and block copolymers such as styrene-butadiene-styrene and styrene-isoprene-styrene block copolymers.

When the web is to be charged to provide electret properties, the resin used to form the melt blown microfibers should be substantially free from materials such as antistatic agents which could increase the electrical conductivity or otherwise interfere with the ability of the fibers to accept and hold electrostatic charges. Preferred resins for preparing the melt blown micro fibers webs for electret materials are polypropylene, poly(4-methyl-pentene), blends thereof and polycarbonate.

Blown micro fibers for fibrous filter media of the invention typically have an effective fiber diameter of from about 3 to 30 micrometers preferably from about 7 to 15 micrometers, as calculated according to the method set forth in Davies, C. N., "The Separation of Airborne Dust and Particles," Institution of Mechanical Engineers, London, Proceedings 1B, 1952.

Staple fibers may also be present in the web. The presence of staple fibers generally provides a more lofty, less dense web than a web of only melt blown microfibers. Preferably, no more than about 90 weight percent staple fibers are present, more preferably no more than about 70 weight percent. Such webs containing staple fiber are disclosed in U.S. Pat. No. 4,118,531 (Hauser) which is incorporated herein by reference.

Sorbent particulate material such as activated carbon or alumina may also be included in the web. Such particles may be present in amounts up to about 80 volume percent of the contents of the web. Such particle-loaded webs are described, for example, in U.S. Pat. No. 3,971,373 (Braun), U.S. Pat. No. 4,100,324 (Anderson) and U.S. Pat. No. 4,429,001 (Kolpin et al.), which are incorporated herein by reference.

The filter media prepared according to the method of the present invention preferably has a basis weight in the range of about 10 to 400 g/m², more preferably about 10 to 100 g/m². In making melt-blown microfiber webs, the basis weight can be controlled, for example, by changing either the collector speed or the die throughput. The average thickness of the filter media is preferably about 1 to 30 mm, more preferably about 2 to 15 mm.

The electret filter media of the invention and the polypropylene resin from which it is produced should not be subjected to any unnecessary treatment which might increase its electrical conductivity, e.g., exposure to gamma rays, ultraviolet irradiation, pyrolysis, oxidation, etc.

The web of the present invention may be prepared using an apparatus as shown in FIG. 1. Such a structure includes a die 10 which has an extrusion chamber 11 through which liquefied fiber-forming material is advanced; die orifices 12 arranged in line across the forward end of the die and through which the fiber-forming material is extruded; and cooperating gas orifices 13 through which a gas, typically heated air, is forced at high velocity. The high velocity gaseous stream draws out and attenuates the extruded fiber-forming material, whereupon the fiber-forming material solidifies as micro fibers during travel to a collector 24.

Collector 24 has an upper collecting drum 25 and a lower collecting drum 26 which are spaced apart and serve to collect web 30. One collecting drum 25 or 26 travels at a surface speed at least twice that of the other collecting drum. Preferably, the collecting drum with the greater surface speed has a surface speed two to six times that of the slower surface speed collecting drum, more preferably three to four times greater. The collector surface is preferably about 0.2 to 2 m, more preferably 0.25 to 1 m, from the die face. The distance between the collecting drums is preferably from about 0.5 cm to 5 cm, more preferably from about 1 cm to 2.5 cm, depending on the weight of the web. Typically, the range of collector surface speed to rate of fiber extrusion is 0.006 to 0.6 m/min per g/m/min for the faster collector surface and 0.003 to 0.08 m/min per g/m/min for the slower collector surface. The collector drums are typically 0.2 to 1 m in diameter. Although drums are shown in this figure, it should be apparent that other collector surfaces such as belts may be used.

Figure 2:
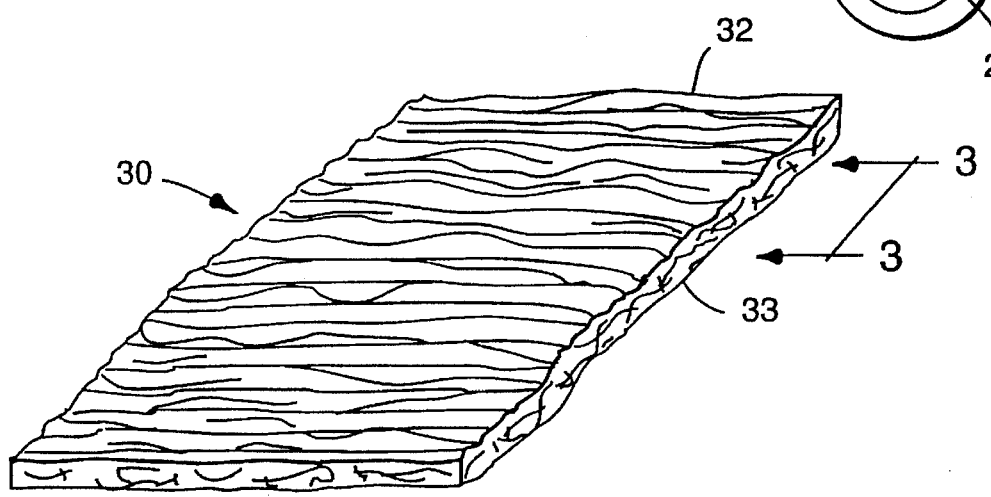
FIG. 2 is a perspective view of filter media of the present invention.
Figure 3:
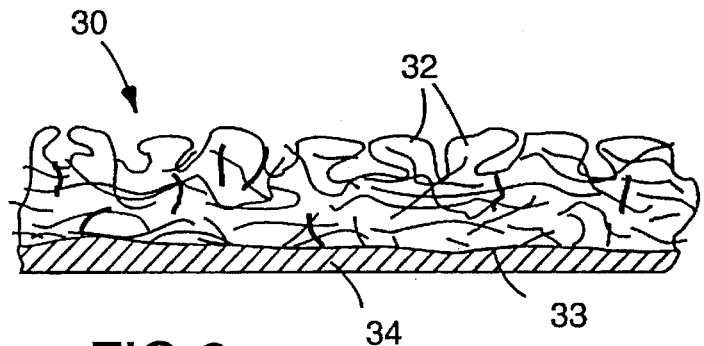
FIG. 3 is a side view of the filter media of the present invention.
Figure 4:
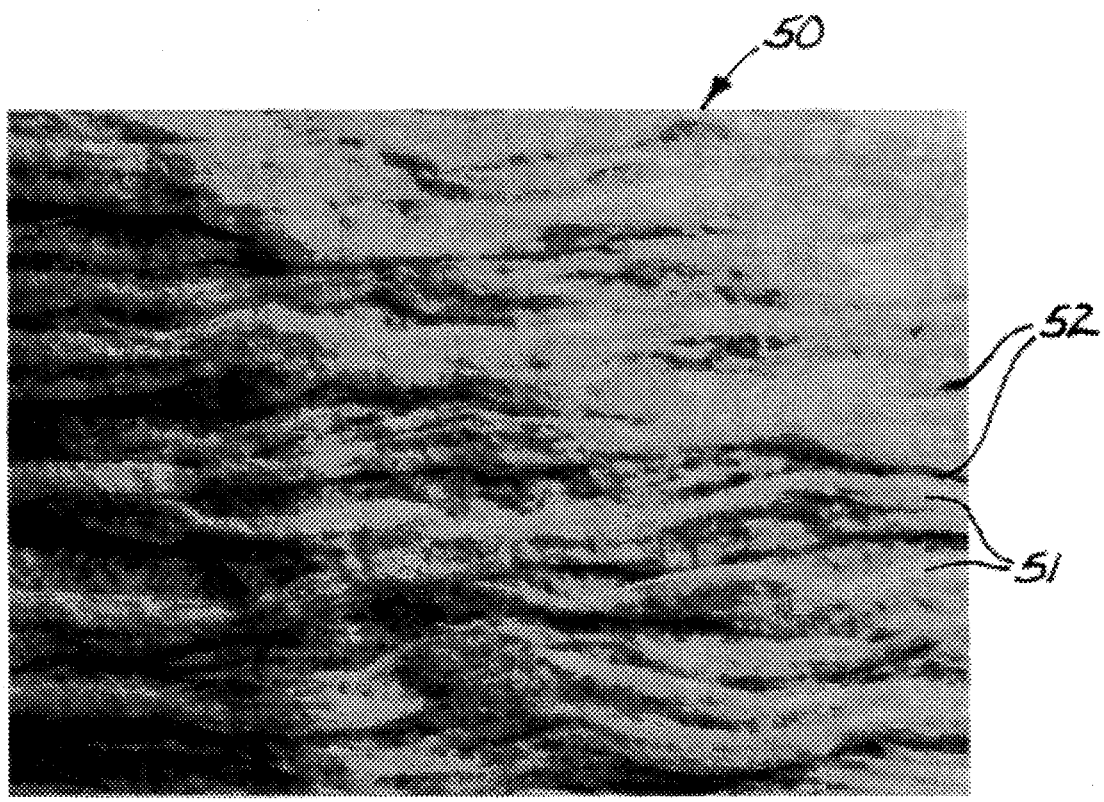
FIG. 4 is a photograph of filter media of the present invention showing the undulated surface.

FIG. 2 shows a perspective view of a web 30 made using this collection system. FIG. 3 is an enlarged fragmentary side view of web 30 taken along lines 3—3 of FIG. 2. The web portion 33 in contact with the slower surface speed collecting drum has a relatively dense, flat surface, while the web portion 32 in contact with the faster surface speed collecting drum has a surface of periodic undulations 32. The fibers in the central portion of the web 30 are substantially transverse to the web surfaces. Preferably, the undulations are about 30 to 70% of the average thickness of the web, more preferably 40 to 60% of the average thickness of the web. The undulation frequency is preferably at least 0.33/cm, more preferably at least 1/cm, most preferably at least 2/cm. A photograph of the surface of a web of the invention having undulations is shown in FIG. 4 wherein web 50 has undulations having peaks 51 and valleys 52.

Figure 5:
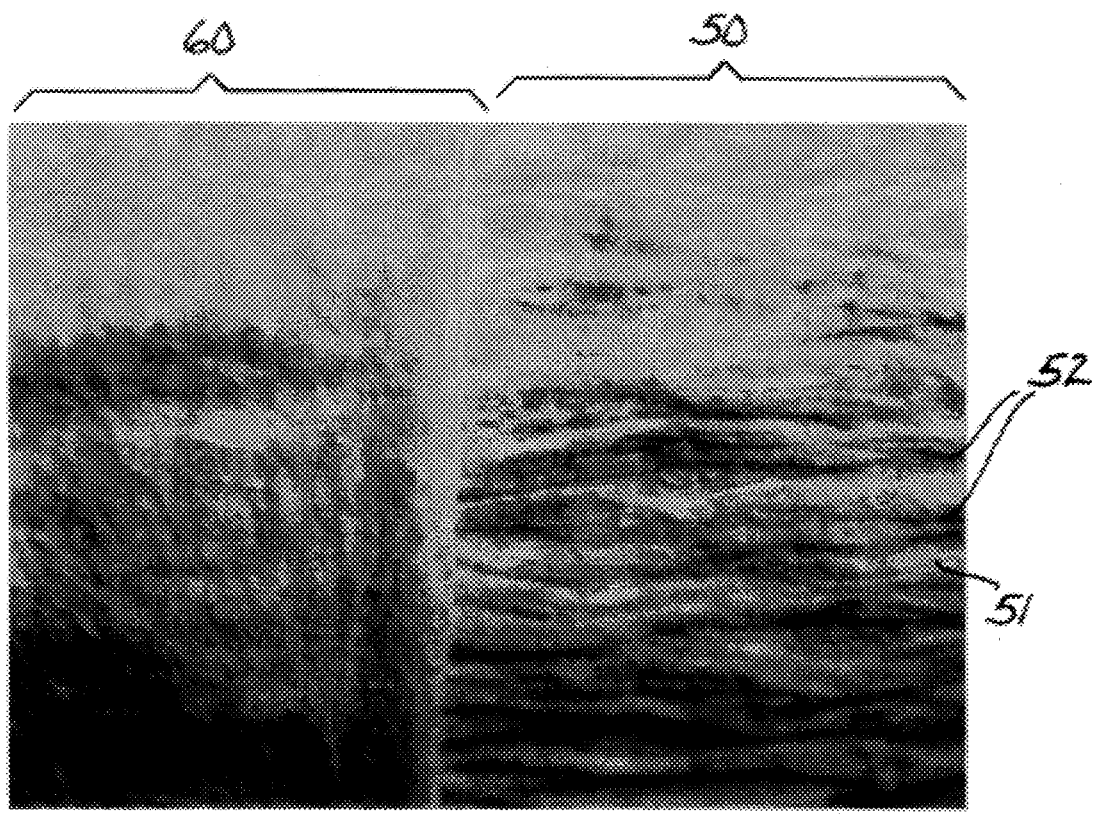
FIG. 5 is a photograph of filter media of the present invention showing the undulated surface on the left side and the substantially flat surface on the right side.

FIG. 5 shows an undulated surface 50 of a web of the invention having peaks 51 and valleys 52 and, next to the undlated surface, a portion of the web showing the substantially flat surface 60.

The substantially flat surface 33 of web 30 preferably has no greater variation in surface depth than about 2 mm, more preferably no more than 1 mm. The web has substantially uniform density, i.e., the undulations do not result from the formation of areas of high density and low density along the length and/or the width of the web. Generally, the density does not vary by more than 50%, more preferably not more than 20%. Due to the substantially uniform density of the web, the web provides a high amount of effective surface area, the effective surface area being that area of the web available for filtering. The web as formed, prior to any subsequent treatment, has substantially 100% effective surface area. Generally, the density of the web varies from the undulated surface to the substantially flat surface with the central portion being less dense than the surface portions.

The web 30 may, optionally, have a scrim 34 adhered to the substantially flat surface. A scrim of very flexible fabric may also optionally be adhered to the undulated surface. The scrim may be adhered to the web by known techniques such as by use of adhesive, sonic welding or pattern bonding. However, such adherence should be carried out so that the maximum amount of effective surace area is retained, preferably at least 80%, more preferably at least 90%, most preferably at least 95% effective surface area retention. Of course, mulitple layers of the unitary web having one face substantially flat and the other face having periodic undulations may also be used to form the filter media.

When staple fibers are present in the web, they may be introduced through use of a lickerin roll 16 disposed above the microfiber blowing apparatus as shown in FIG. 1. A web 17 of staple, typically a loose, nonwoven web such as prepared on a garnet or RANDO-WEBBER apparatus, is propelled along table 18 under drive roll 19 where the leading edge engages against the lickerin roll 16.

The lickerin roll 16 picks off fibers from the leading edge of web 17 separating the fibers from one another. The picked fibers are conveyed in an air stream through an inclined trough or duct 20 and into the stream of blown microfibers where they become mixed with the blown microfibers.

When particulate matter is to be introduced into the web it may be added using a loading mechanism similar to duct 20.

The electret filter media of the invention may be electrostatically charged using any known process such as, for example, those described in U.S. Pat. No. Re. 30,782 (van Turnbout), U.S. Pat. No. Re. 31,285 (van Turnhour), U.S. Pat. No. 4,375,718 (Wadsworth et al.), U.S. Pat. No. 4,588,537 (Klaase et al.), or U.S. Pat. No. 4,592,815 (Nakao). In general, subsequent to charging with corona discharge. Hydrocharging of the electret web is carried out by impinging water droplets onto the web at a pressure sufficient to provide the web with increased filter efficiency. The pressure necessary to achieve optimum results will vary depending on the type of polymer from which the web is formed, the thickness and density of the web. Generally, pressures in the range of about 10 to 500 psi (69 to 3450 kPa) are suitable. Preferably the water used to provide the water jets or droplets is relatively pure. Distilled or deionized water is preferable to tap water.

The water jets or droplets can be provided by any suitable spray means. Those apparatus useful for hydraulically hydroentangling fibers are generally useful in the method of the present invention, although operation is carried out at lower pressures in hydrocharging than are generally used in hydroentangling.

Figure 6:
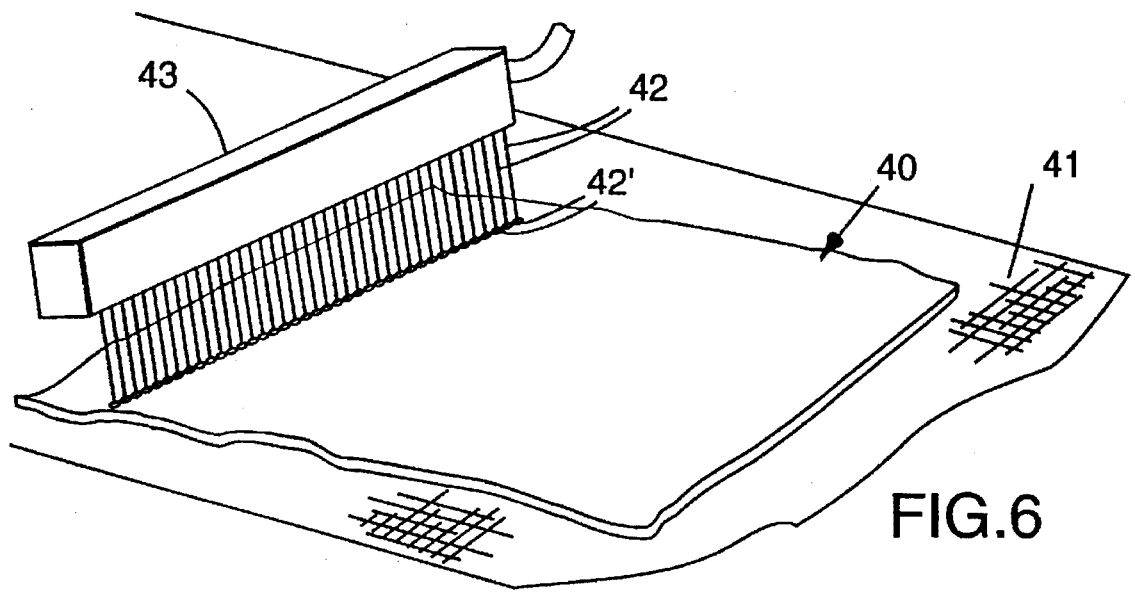
FIG. 6 is a perspective view of an apparatus for providing the filter media of the invention with an electret charge.

An example of a suitable spray means is shown in FIG. 6 where fibrous web 40 is transported on support means 41. The transport means may be in the form of a belt, preferably porous, such as a mesh screen or fabric. Water jets 42 in water jet head 43 provide the water spray with a pump (not shown) providing the water pressure. Water jets 42 impinge on web 40 at impingement points 42'. Preferably, a vacuum is provided beneath a porous support to aid in passage of the spray through the web and to reduce drying energy requirements.

Figure 7:
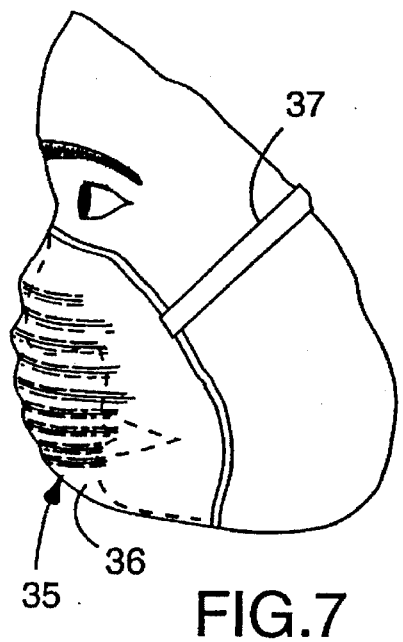
FIG. 7 is a side view of the face mask of the present invention.

FIG. 7 illustrates a convenient configuration for the face masks of the invention. The mask 35 includes a generally cup-like shaped member 36 which is adapted to fit over the mouth and nose of a person, and a strap 37 for supporting the mask. The edge of the mask tends to fit rather closely to the contours of the face and thus defines the air inlet to the wearer of the mask; i.e., most of the air breathed by a wearer of the mask must pass through the mask. The mask may optionally have shaping or protective layers on one or both sides of the web. Such layers may be a spunbonded, carded, garnetted or air-laid fibrous web. both sides of the web. Such layers may be a spunbonded, carded, garnetted or air-laid fibrous web.

In the following examples, all percentages and parts are by weight unless otherwise noted. The following test methods were used to evaluate the examples.

DOP Penetration and Pressure Drop

Dioctyl phthalate (DOP) 0.3 micrometer diameter particles at a concentration of between 70 and 110 mg/m$^3$ are generated using a TSI No. 212 sprayer with four orifices and 30 psi (207 kPa) clean air. The particles are forced through a sample of filter media which is 11.45 cm in diameter at a rate of 42.5 L/min. which is a face velocity of 6.9 centimeters per second. The sample was exposed to the aerosol for 30 seconds. The penetration is measured with an optical scattering chamber, Percent Penetration Meter Model TPA-8F available from Air Techniques Inc. The DOP penetration on the charged filter media of the present invention is preferably less than about 80%, more preferably less than about 70%. The pressure drop is measured at a flow rate of 42.5 L/min and a face velocity of 6.9 cm/sec using an electronic manometer. Pressure drop is measured as $\Delta P$ in mm of water.

The penetration and pressure drop are used to calculate a quality factor "QF value", from the natural log (ln) of the DOP penetration by the following formula:

$$QF\ [1/mm\ H_2O] = \frac{-Ln\frac{DOP\ Penetration\ (\%)}{100}}{Pressure\ Drop\ [mm\ H_2O]}$$

A higher initial QF value indicates better initial filtration performance. Decreased QF values effectively correlate with decreased filtration performance. Generally a QF value of at least about 0.25 is preferred, a value of at least about 0.5 is more preferred and a value of at least about 1 is most preferred.

NaCl Loading Test

Loading tests were performed on a TSI Model 8110 Automated Filter Tester available from TSI, Inc. according to the procedure set forth in the tester manual, part no. PN1980053, p. 47. The samples received a 200 mg sodium chloride challenge at 85 L/min with the particle ionizer operating. Test samples had an exposed area of 100.3 cm$^2$ with a face velocity of 14.1 cm/sec.

Lacquer Loading Test

Loading tests were performed according to OSHA Standard 32 CFR Part 11.162–5. A 56.7 cm$^2$ sample is tested at a 16 L/min challenge. The pressure drop across the webs was measured in mm of water at 42.5 L/min flow rate through the sample. Percent penetration was determined from weight differences of the media under test before and after testing and weight gain of a downstream high efficiency particulate filter. Preferably, the pressure drop increase is less than about 10 mm of water and the percent capture is greater than 90 percent.

Web Thickness

The average web thickness was measured using about 0.1 g/cm$^2$ on the caliper. Web thicknesses are averages of at least thirty individual measurements.

EXAMPLES 1–4 AND COMPARATIVE EXAMPLE C1

A polypropylene (ESCORENE 3505G, available from Exxon Corp.) microfiber web was prepared as described in Wente, Van A., "Superfine Thermoplastic Fibers," *Industrial Engineering Chemistry*, vol. 48, pp. 1342–1346. The web was collected on a dual drum collector as shown in FIG. 1. Each drum was 0.46 m in diameter and was formed of TEFLON coated perforated metal. The gap between the collector drums was 1.27 cm. The collector gap was placed 0.74 m from the die tip. The drums were positioned so that the fibers impacted equally on each drum surface about 5 cm above and below the centerline. The contacting portions of the collector drum surfaces move away from the extrusion die to draw the collected web through the gap between the rolls. The rolls rotated at the surface speeds and speed ratio of the upper drum to the lower drum as set forth in Table 1. The webs were collected onto spunbonded polypropylene fabric (13.5 g/m$^2$, available from Fiberweb North America, Inc.) for ease of handling. Effective fiber diameters in each web was between about 10 to 12 μm. Each web had a basis weight of about 50 g/m². Average web thickness under 0.1 g/cm² pressure and pressure drop (ΔP) at 5.2 cm/sec face velocity were determined and are set forth in Table 1.

TABLE 1

| Example | Drum Speed (m/min) Lower | Drum Speed (m/min) Upper | Speed Ratio | ΔP | Thickness (cm) |
|---|---|---|---|---|---|
| C1 | 5.9 | 5.9 | 1 | 0.52 | 0.51 |
| 1 | 5.6 | 11.3 | 2 | 0.39 | 0.38 |
| 2 | 5.7 | 16.5 | 2.9 | 0.33 | 0.51 |
| 3 | 5.6 | 22.6 | 4 | 0.39 | 0.38 |
| 4 | 5.9 | 34.7 | 6 | 0.36 | 0.48 |

Undulation dimensions were also determined for each web sample. The web thickness at the peaks, $T_h$, and valleys, $T_1$, was measured and undulation ratios were calculated using the formula $T_h-T_1/(T_h+T_1)/2$. The frequency of the undulations peaks per cm was also measured. The results are set forth in Table 2. There were no periodic undulations in Comparative Example C1.

TABLE 2

| Example | $T_1$ (mm) | $T_h$ (mm) | Undulation Ratio | Undulation Frequency |
|---|---|---|---|---|
| 1 | 3.8 | 10.3 | 0.92 | 1.6 |
| 2 | 2.6 | 7.8 | 1 | 2.5 |
| 3 | 2.5 | 9.5 | 1.16 | 3.6 |
| 4 | 2.2 | 9.0 | 1.21 | 3.6 |

The webs were tested for lacquer loading. The initial pressure drop, final pressure drop and percent captured are set forth in Table 3.

TABLE 3

| Example | Initial ΔP | Final ΔP | % Captured |
|---|---|---|---|
| C1A | 1.6 | 20.1 | 96.9 |
| 1A | 1.5 | 8.3 | 95.4 |
| 2A | 1.3 | 8.7 | 96.4 |
| 3A | 1.0 | 5.6 | 93.0 |
| 4A | 1.1 | 5.0 | 93.6 |

As can be seen from the data in Table 3, the samples of Examples 1A, 2A, 3A and 4A having the undulated surfaces had reduced pressure drop increase during the loading test over that observed for the flat construction of Example C1A.

Samples of the webs were subjected to corona treatment by passing the web, in contact with an aluminum ground plane, under a positive DC corona twice at a rate of 1.2 m/min with the current maintained at about 0.01 mA/cm corona source and the corona source about 4 cm from the ground plate. The DOP penetration and pressure drop were measured and the quality factor was calculated. The penetration (Pen) and quality factors (QF) are set forth in Table 4.

TABLE 4

| Example | Pen (%) | QF |
|---|---|---|
| C1B | 54 | 0.60 |
| 1B | 59 | 0.61 |
| 2B | 53 | 0.77 |

TABLE 4-continued

| Example | Pen (%) | QF |
|---|---|---|
| 3B | 63 | 0.62 |
| 4B | 64 | 0.67 |

As can be seen from the data in Table 4, each of the webs performed satisfactorily with regard to filtration of the dioctyl phthalate.

Samples of corona treated webs were subjected to impingement of jets of water provided by a hydroentangler (Laboratory Model, serial no. 101, available from Honeycomb Systems, Corp.) which had a spray bar width of 0.6 m with 40 spray orifices, each 0.13 mm in diameter, per 2.5 cm width at 690 kPa. The samples were passed under the bar undulated side down once at a rate of 3.5 m/min and then again at the same rate undulated side up, vacuum extracted and dried at 70° C. for one hour. The DOP penetration and pressure drop were measured and the quality factor was calculated. The penetration and quality factors are set forth in Table 5.

TABLE 5

| Example | Pen (%) | QF |
|---|---|---|
| C1C | 15 | 1.25 |
| 1C | 20 | 1.28 |
| 2C | 14 | 1.62 |
| 3C | 17 | 1.55 |
| 4C | 22 | 1.47 |

As can be seen from the data in Table 5, each of the electret webs showed good DOP filtration properties. The electret webs of Examples 2C, 3C and 4C prepared at high drum surface speed ratios had very good performance.

The corona charged/hydrocharged webs were tested for sodium chloride loading. The initial pressure drop (Init ΔP), final pressure drop (Fin ΔP), initial percent penetration (Init Pen), final percent penetration (Fin Pen) and the mount captured (% Cap) are set forth in Table 6.

TABLE 6

| Example | Init ΔP | Fin ΔP | Init Pen | Fin Pen | % Cap |
|---|---|---|---|---|---|
| C1D | 2.9 | 77.3 | 2.49 | 0.002 | 98.3 |
| 1D | 2.5 | 35.2 | 8.84 | 0.48 | 95.9 |
| 2D | 2.5 | 20.9 | 2.94 | 1.33 | 96.5 |
| 3D | 2.2 | 16 | 4.01 | 2.81 | 94.3 |
| 4D | 2.3 | 17.2 | 8.44 | 2.97 | 92.3 |

As can be seen from the data in Table 6, the web of Comparative Example C1D had a high final pressure drop of 77.3 mm of water due to cake formation on the surface, while Examples 1D through 4D had final pressure drops of less than half that of the Comparative Example. Examples 2D and 3D show an excellent balance in reduced increase in pressure drop and penetration of aerosol.

EXAMPLES 5–7

Examples 5–7 were prepared as in Examples 1–4 using a lower drum surface speed of 5.5 m/min and an upper drum surface speed of 16.8 m/min to give a speed ratio of 3.1. The gap between the collector drums was as set forth in Table 7. Each web had a basis weight of about 50 g/m². The average thicknesses were measured and are set forth in Table 7.

Samples of each web were subjected to corona treatment as in Examples 1C–4C. The DOP penetration and pressure drop of these corona charged webs was measured and the quality factor was calculated. The penetration and the quality factor are set forth in Table 7.

TABLE 7

| Example | Gap (cm) | Thickness | Pen | QF |
|---|---|---|---|---|
| 5A | 0.635 | 0.38 | 58 | 0.63 |
| 6A | 1.27 | 0.51 | 53 | 0.77 |
| 7A | 2.54 | 0.43 | 60 | 0.58 |
| 8A | 5.08 | 0.46 | 74 | 0.49 |

As can be seen from the data in Table 7, at 50 g/m² basis weight and drum surface speed ratios of about 3, the lesser gap widths used to prepare the webs of Example 5A and 6A provided better electret filtration properties.

Samples of each of the corona treated webs were subjected to impingement of jets of water as in Examples 1C–4C. The pressure drop and DOP penetration were measured and the quality factor was calculated. The penetration and quality factor are set forth in Table 8 together with the gap pressure drop and thickness.

TABLE 8

| Example | Gap (cm) | Thickness | Pen | QF |
|---|---|---|---|---|
| 5B | 0.635 | 0.38 | 16 | 1.3 |
| 6B | 1.27 | 0.51 | 14 | 1.62 |
| 7B | 2.54 | 0.43 | 18 | 1.15 |
| 8B | 5.08 | 0.46 | 42 | 0.74 |

Undulation dimensions were also determined for web samples of Examples 6, 7 and 8. The web thickness at the peaks, $T_h$, and valleys, $T_1$, was measured and undulation ratios were calculated using the formula $T_h-T/(T_h+T_1)/2$. The frequency of the undulations per cm was also measured. The results are set forth in Table 9.

TABLE 9

| Example | $T_1$ (mm) | $T_h$ (mm) | Undulation Ratio | Undulation Frequency |
|---|---|---|---|---|
| 6 | 2.6 | 7.8 | 1 | 2.5 |
| 7 | 4.1 | 15 | 1.14 | 0.42 |
| 8 | 5.7 | 20.2 | 1.11 | 0.39 |

EXAMPLES 9–12 AND COMPARATIVE EXAMPLES C2–C5

In Examples 9–12, webs were prepared as in Examples 1–4 using a gap of 1.27 cm. The collector drum surface speeds, the speed ratio, the pressure drop (ΔP) at 5.2 cm/sec face velocity, the average thickness and the basis weight are as set forth in Table 10.

TABLE 10

| | Drum Speed (m/min) | | Speed | Basis Weight | | Thickness |
|---|---|---|---|---|---|---|
| Example | Lower | Upper | Ratio | (g/m²) | ΔP | (cm) |
| 9 | 16.5 | 48.2 | 2.9 | 15 | 0.1 | 0.23 |
| 10 | 5.7 | 16.5 | 2.9 | 50 | 0.33 | 0.51 |

TABLE 10-continued

| | Drum Speed (m/min) | | Speed | Basis Weight | | Thickness |
|---|---|---|---|---|---|---|
| Example | Lower | Upper | Ratio | (g/m²) | ΔP | (cm) |
| 11 | 2.7 | 8.2 | 3.0 | 100 | 0.88 | 0.74 |
| 12 | 1.6 | 4.9 | 3.0 | 200 | 1.85 | 0.99 |

Undulation dimensions were also determined for each web sample. The web thickness at the peaks, $T_h$, and valleys, $T_1$, was measured and undulation ratios were calculated using the formula $T_h-T_1/(T_h+T_1/2$. The frequency of the undulations per cm was also measured. The results are set forth in Table 11.

TABLE 11

| Example | $T_1$ (mm) | $T_h$ (mm) | Undulation Ratio | Undulation Frequency |
|---|---|---|---|---|
| 9 | 1 | 4.3 | 1.25 | 2.3 |
| 10 | 2.6 | 7.8 | 1 | 2.5 |
| 11 | 7.5 | 14.3 | 0.62 | 2.4 |
| 12 | 13.11 | 24 | 0.58 | 2.7 |

For Comparative Examples C2-C5, webs were extruded as in Examples 1–4 except the webs were collected on a single drum collector placed 0.58 m from the die tip. The effective fiber diameters were 10.6 to 12 µm. The basis weight was measured and is set forth in Table 12.

Samples of web of Examples 9–12 and Comparative Examples C2–C5 were subjected to corona discharge as in Examples 1–4. The DOP pressure drop and penetration were measured and the quality factor was calculated. The penetration and quality factor are set forth in Table 12.

TABLE 12

| Example | Basis Weight (g/m²) | Pen (%) | QF |
|---|---|---|---|
| 9A | 15 | 80 | 0.76 |
| C2A | 14 | 69 | 0.85 |
| 10A | 50 | 53 | 0.77 |
| C3A | 50 | 44 | 0.73 |
| 11A | 100 | 54 | 0.47 |
| C4A | 100 | 29 | 0.57 |
| 12A | 200 | 57 | 0.19 |
| C4A | 200 | 30 | 0.29 |

As can be seen from the data in Table 12, the undulated webs of the invention had similar DOP penetration and quality factor to the webs collected on a single drum except for the web having 200 g/m² basis weight.

Samples of the corona treated web were hydrocharged with jets of water as in Examples 1C–4C. The DOP pressure drop and penetration were measured and the quality factor was calculated. The basis weight, penetration and quality factor are set forth in Table 13.

TABLE 13

| Example | Basis Weight (g/m²) | Pen (%) | QF |
|---|---|---|---|
| 9B | 15 | 56 | 1.23 |
| C2B | 14 | 63 | 0.98 |

TABLE 13-continued

| Example | Basis Weight (g/m²) | Pen (%) | QF |
| --- | --- | --- | --- |
| 10B | 50 | 14 | 1.62 |
| C3B | 50 | 14 | 1.04 |
| 11B | 100 | 11 | 1.16 |
| C4B | 100 | 13 | 0.97 |
| 12B | 200 | 17 | 0.57 |
| C5B | 200 | 5.4 | 0.67 |

As can be seen from the data in Table 13, all samples had good percent penetration and quality factor values. The quality factor values for Examples 9B, 10B and 11B having the undulated surface were higher than for Comparative Examples 2B, 3B and 4B.

EXAMPLES 13–15

In Examples 13–15, webs were made as in Examples 1–4 using a gap of 1.27 cm except the webs contained 50 weight percent staple fiber. In Example 13 the staple fiber was 17 denier, 5.1 cm long "natural" polypropylene, available from Synthetic Industries; in Example 14 the staple fiber was 15 denier, 3.1 cm polyester, KODEL K-431 available from Eastman Chemical Co.; and in Example 15 the staple fiber was 6 denier, 5.1 cm polyester, KODEL K-211, available from Eastman Chemical Co. Prior to use, the polyester staple fibers were washed to remove surface finish using about 2 weight percent LIQUINOX (available from Alconox, Inc.) in hot water (about 140° F., 60° C.) with agitation for about 5 minutes, rinsed and dried. The collector drum surface speeds, and the speed ratio are set forth in Table 14. Each web weighed 50 g/m². The pressure drop of each web and the and average thickness of Examples 13 and 14 were measured and are set forth in Table 14.

TABLE 14

| Example | Drum Speed (m/min) | | Speed Ratio | ΔP | Thickness (cm) |
| --- | --- | --- | --- | --- | --- |
| | Lower | Upper | | | |
| 13 | 11.3 | 35.8 | 3.2 | 0.17 | 0.94 |
| 14 | 11.4 | 36.0 | 3.1 | 0.14 | 0.69 |
| 15 | 11.1 | 36.0 | 3.2 | 0.12 | — |

Samples of web of Examples 13–15 were subjected to corona discharge as in Examples 1C–4C. The pressure drop and DOP penetration were measured and the quality factor was calculated. The penetration and quality factor are set forth in Table 15.

TABLE 15

| Example | Pen | QF |
| --- | --- | --- |
| 13A | 78 | 0.76 |
| 14A | 79 | 0.73 |
| 15A | 82 | 0.58 |

Samples of the corona treated webs were hydrocharged with jets of water as in Examples 1C–4C. The pressure drop and penetration were measured and the quality factor was calculated. The basis weight, DOP penetration and quality factor are set forth in Table 16.

TABLE 16

| Example | Pen | QF |
| --- | --- | --- |
| 13B | 53 | 1.41 |
| 14B | 41 | 2.08 |
| 15B | 52 | 1.60 |

As can be seen from the data in Tables 15 and 16, while the webs which were corona charged show acceptable Quality Factors, the webs which were corona charged and then hydrocharged exhibit low pressure drop and excellent reduction in penetration as shown by the high Quality Factor values.

The various modifications and alterations of this invention will be apparent to those skilled in the art without departing from the scope and spirit of this invention and this invention should not be restricted to that set forth herein for illustrative purposes.

What is claimed is:

1. Filter media comprising a web of melt blown microfibers at least 1 mm thick, one surface being substantially flat and the other surface having periodic undulations comprising waves of peaks and valleys across said web wherein the peaks of the undulations overlie at least a portion of the adjacent valleys, said undulations lying transverse to the web formation direction, said undulations being 30 to 70% of the thickness of the web and having a frequency of at least about 0.33/cm.

2. Filter media according to claim 1 wherein said web has substantially uniform density.

3. Filter media according to claim 2 wherein said density does not vary by more than 50%.

4. Filter media according to claim 2 wherein said density does not vary by more than 20%.

5. The filter media of claim 1 wherein said substantially flat surface has no greater variation in surface depth than about 2 mm.

6. The filter media of claim 1 wherein said web has substantially uniform density across the web.

7. The filter media of claim 1 wherein said web has an average thickness of about 1 to 30 mm.

8. The filter media of claim 1 wherein said web weighs about 10 to 400 g/m².

9. The filter media of claim 1 wherein said microfibers are polypropylene, poly(4-methyl-1-pentene) or blends thereof.

10. The filter media of claim 1 wherein said microfibers have an effective diameter of about 3 to 30 micrometers.

11. The filter media of claim 1 wherein said web further contains staple fiber.

12. The filter media of claim 1 wherein said staple fibers comprise no more than about 90 weight percent of said web.

13. The filter media of claim 1 wherein said web further contains sorbent particulate matter.

* * * * *